Nov. 8, 1938.  A. C. HANSCH ET AL  2,135,506
CAMERA STOP DEVICE AND TIMING MEANS THEREFOR
Filed April 25, 1936  6 Sheets-Sheet 2

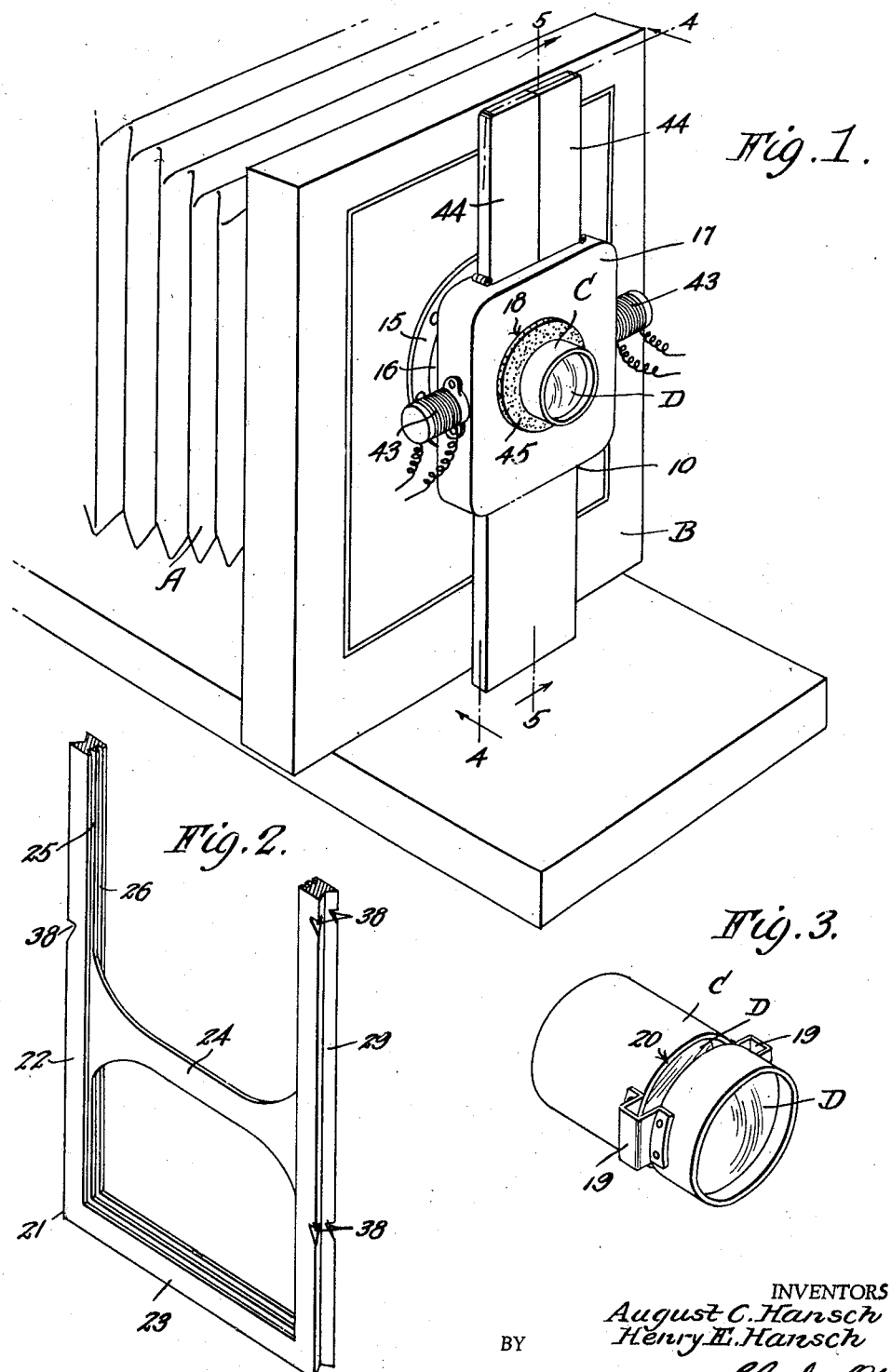

INVENTORS
August C. Hansch
Henry E. Hansch
BY Clark & Ott
ATTORNEYS.

Nov. 8, 1938.     A. C. HANSCH ET AL     2,135,506
CAMERA STOP DEVICE AND TIMING MEANS THEREFOR
Filed April 25, 1936     6 Sheets-Sheet 3
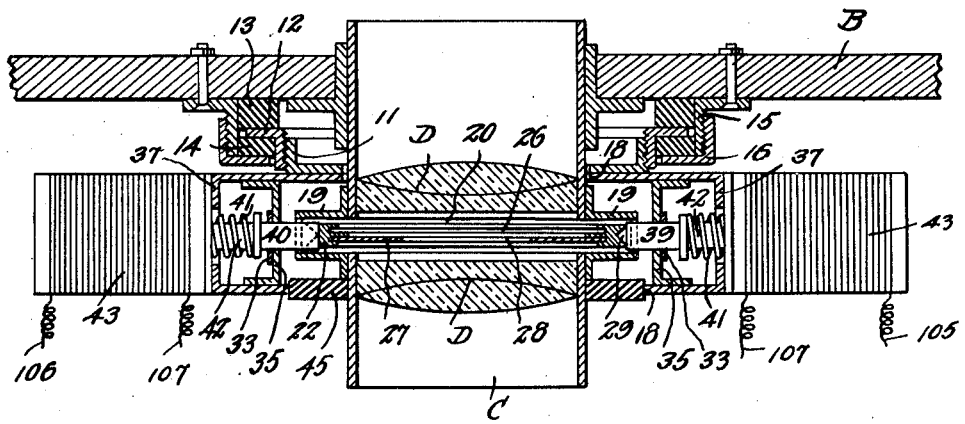
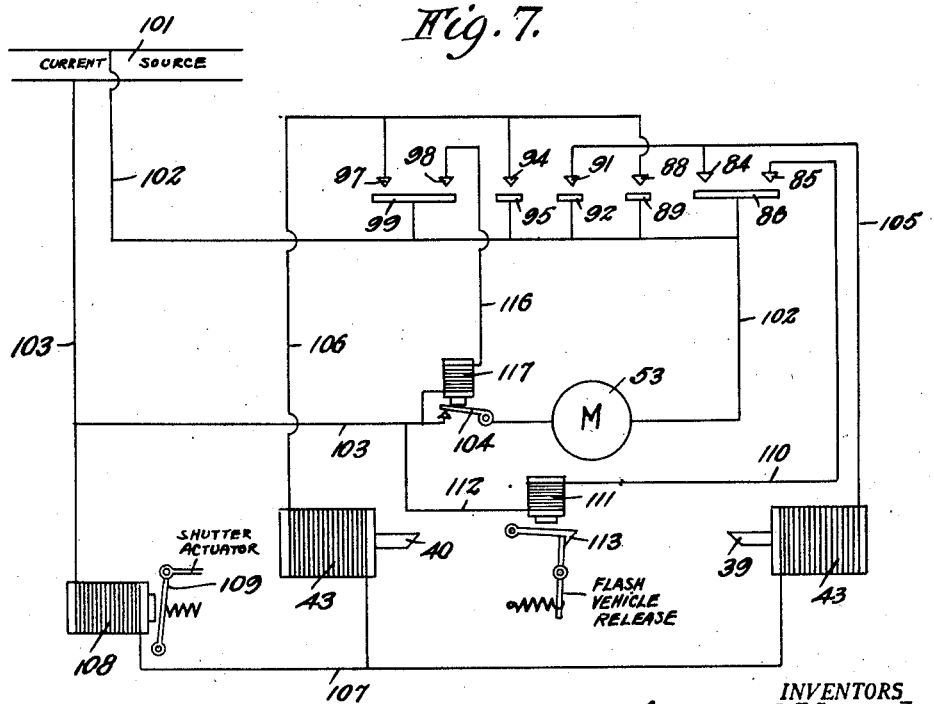
INVENTORS
August C. Hansch
Henry E. Hansch
BY
Clark & Ott
ATTORNEYS.

Nov. 8, 1938.  A. C. HANSCH ET AL  2,135,506
CAMERA STOP DEVICE AND TIMING MEANS THEREFOR
Filed April 25, 1936   6 Sheets-Sheet 4
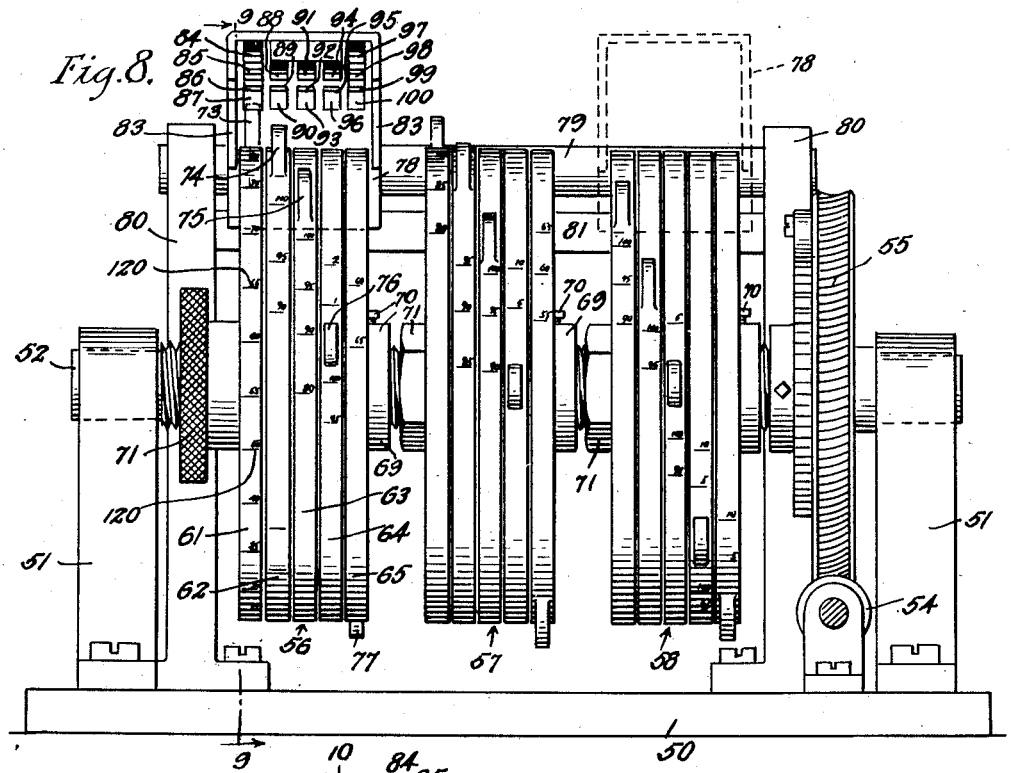
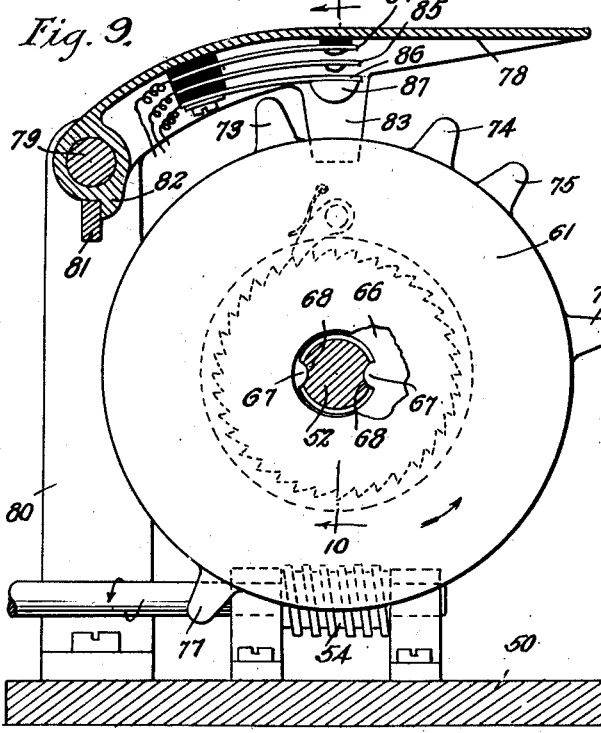
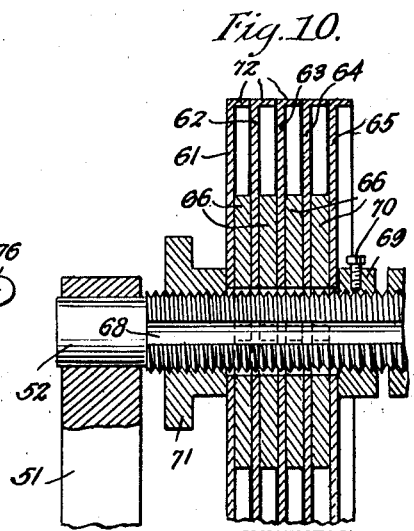
INVENTORS
August C. Hansch
Henry E. Hansch
BY Clark & Ott
ATTORNEYS.

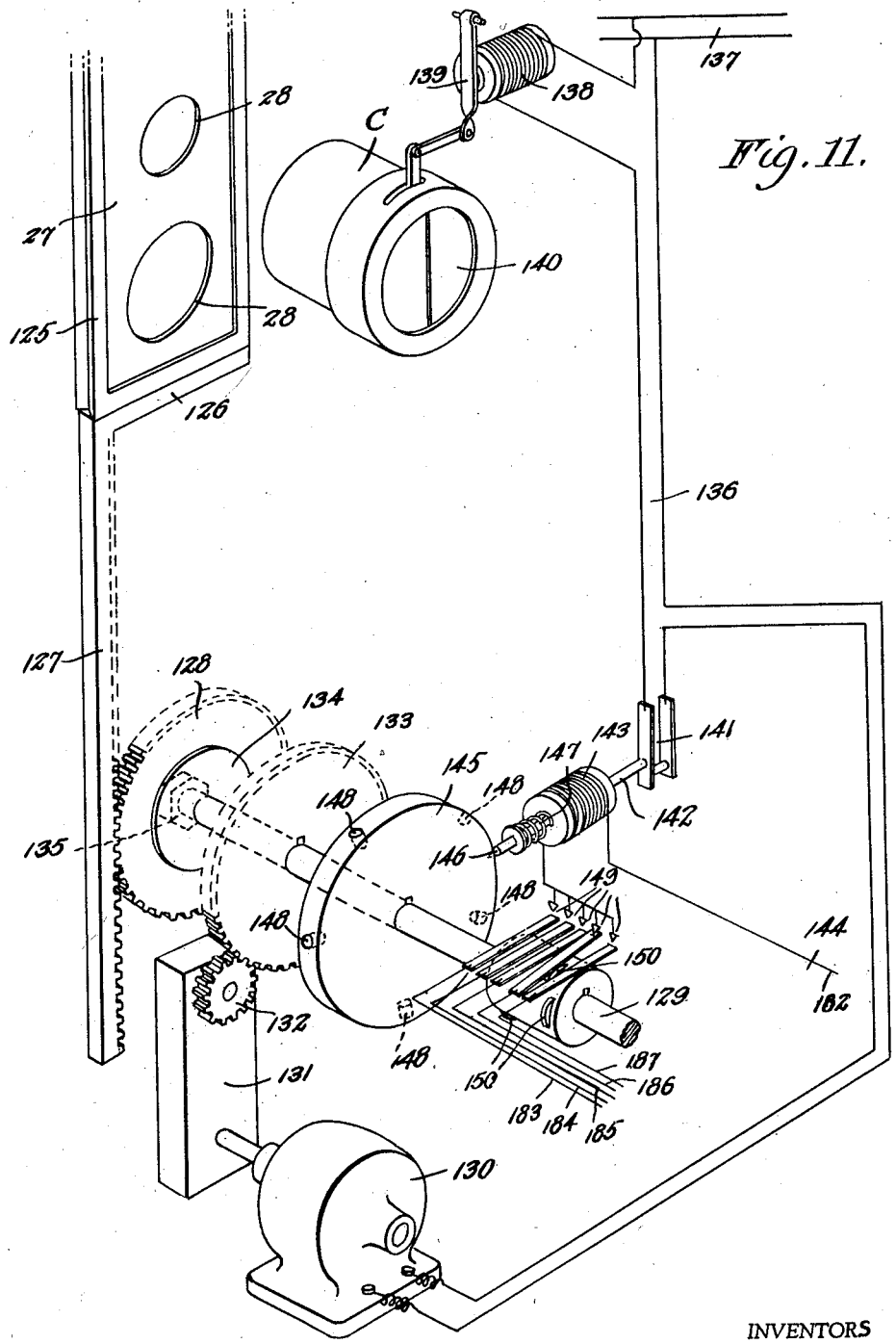

Nov. 8, 1938.  A. C. HANSCH ET AL  2,135,506
CAMERA STOP DEVICE AND TIMING MEANS THEREFOR
Filed April 25, 1936   6 Sheets-Sheet 6

INVENTORS
August C. Hansch
Henry E. Hansch
BY Clark & Ott
ATTORNEYS

Patented Nov. 8, 1938

2,135,506

UNITED STATES PATENT OFFICE 2,135,506

CAMERA STOP DEVICE AND TIMING MEANS THEREFOR

August C. Hansch, Cliffside, and Henry E. Hansch, Whippany, N. J.; said August C. Hansch assignor to Frank J. McCann and John F. Monahan Application April 25, 1936, Serial No. 76,446

13 Claims. (Cl. 95—64)

This invention relates to a stop device for cameras of the type employed in the photographic production of half-tone or screen negatives or positives.

The invention broadly comprehends, in a camera of the indicated character, a stop device having a plurality of fixed stop openings of different sizes which openings are adapted to be independently brought into registry with the camera lens for making the exposures therethrough.

The invention further resides in a stop device including a stop plate and a holder therefor, movably supported with reference to the lens components of a camera in which the stop plate is provided with a plurality of fixed stop openings of various sizes and means associated therewith for successively disposing the stop plate openings in registration with the camera lens, together with a timing device functioning to effect the successive movement of the holder and stop plate and the registration of the stop openings with the camera lens for predetermined time periods so as to obtain half-tone or screen negatives of high quality and possessing uniform characteristics.

The invention also resides in the provision of a stop plate holder adapted to selectively receive any one of a plurality of readily interchangeable stop plates each of which is provided with a plurality of fixed stop openings, the stop openings of the several plates being variously arranged and of relatively different sizes and/or shapes.

More specifically the invention contemplates, in a stop device of the indicated character, a housing supported in juxtaposition to the front board of the camera and having means for mounting the stop holder for guided movement in a plane approximately at a right angle to the axis of the camera lens, and automatically actuated latch means adapted to engage with the stop holder for effecting the registration of the stop openings with the camera lens, the actuation of said latch means being responsive to the predetermined selective setting of a timing device for successively positioning the said stop openings in registration with the camera lens in response to the predetermined set time periods of the timing device.

The invention also includes means for mounting the stop device in associated relation with the lens barrel so as to prevent transmission to the lens of shocks or jars incident to the operation of the stop device.

The invention also has in view a timing device including a plurality of sets of variable members, the members in each set corresponding in number to the number of the stop-openings of the stop device and each set being adapted to be selectively adjusted so as to obtain various predetermined periods of time exposure of the negative through the said stop openings together with a common circuit closing means which may be selectively associated with any one of said sets for actuating the stop device.

With these and other objects in view, reference is now made to the following specification and accompanying drawings in which there are illustrated several preferred embodiments of the invention, while the appended claims cover variations and modifications thereof which fall within the scope of the invention.

In the drawings:

Fig. 1 is a fragmentary perspective view on a reduced scale of a camera of the type employed in the production of half-tone or screen negatives or positives, equipped with a stop device constructed in accordance with the invention.

Fig. 2 is a sectional perspective view of the stop plate holder.

Fig. 3 is a detail perspective view of the lens barrel used in connection with the improved stop device.

Fig. 6 is a sectional plan view taken approximately on the line 6—6 of Fig. 4.

Fig. 7 is a diagrammatic view of the wiring.

Fig. 8 is a front elevation of the timing device.

Fig. 9 is a transverse sectional view therethrough taken approximately on the line 9—9 of Fig. 8.

Fig. 10 is a longitudinal sectional view through the timing device taken approximately on the line 10—10 of Fig. 9.

Fig. 11 is a diagrammatic perspective view of a modified form of stop device and the wiring diagram therefor.

Figure 4:
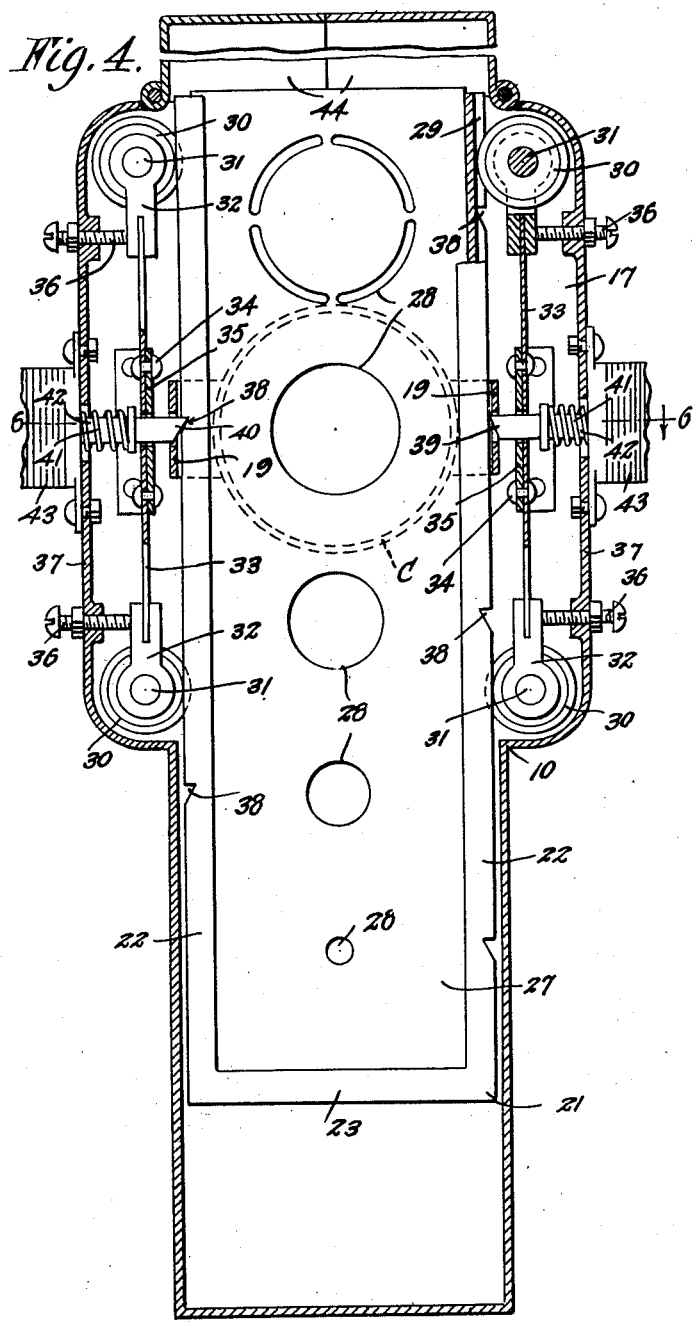
Fig. 4 is a vertical transverse sectional view therethrough taken approximately on a plane indicated by the line 4—4 in Fig. 1.
Figure 5:
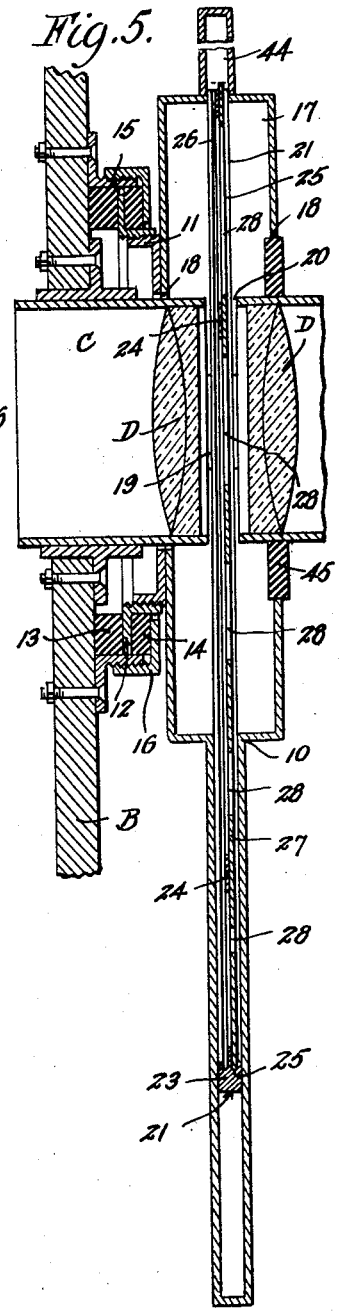
Fig. 5 is a vertical sectional view taken approximately on the line 5—5 of Fig. 1.

Referring to the drawings by characters of reference, A indicates generally the bellows of the camera, B the front board and C the lens barrel in which are arranged the usual lens components each consisting of lens elements D.

The stop device includes a housing 10 which is suitably supported in front of and in juxtaposition to the front board B of the camera. As illustrated, the housing is attached to and carried by the front board B by means of a cushioned shock proof mounting which includes a threaded tubular boss 11 which is secured to and protrudes rearwardly from the housing 10 and has threadedly engaged thereover an annular flanged element 12 which is confined between elastic rings 13 and 14 located within a collar 15 attached to the front board and retained in place by a cap member 16 threadedly engaging the collar 15. This cushioned shock proof mounting prevents the transmission to the camera or lens of shocks caused by the operation of the stop device.

The front and rear walls of the medial enlarged portion 17 of the housing 10 are apertured as at 18 to fit over and loosely surround the lens barrel C which protrudes therethrough, the lens barrel being divided into sections joined together in spaced relation by diametrically disposed substantially U-shaped bridge pieces 19 so as to define a passageway 20. The lens elements D are respectively arranged in the lens barrel sections so that a stop holder 21 may freely pass through the passageway between the lens elements. The stop holder 21 consists of a frame having spaced parallel vertical stiles 22 connected by a bottom stile 23 and relatively thin cross braces 24. The inner edges of the side stiles 22 and bottom stile 23 are formed with longitudinally extending grooves 25 and 26, one of which sets of grooves is adapted to removably receive interchangeable stop plates 27 formed with a plurality of longitudinally spaced stop openings 28 having their centers in vertical alignment, the stop openings being of relatively different fixed sizes and/or shapes and variously arranged in accordance with the work to be done, in the present instance, the stop holder being shown with stop openings 28 of progressively increasing fixed sizes. The other set of grooves 26 is adapted to receive filter plates of various colors in accordance with the work to be accomplished.

The outer edges of the side stiles 22 are formed with longitudinally extending V-shaped grooves 29 with which guide wheels 30 having V-shaped peripheries are adapted to engage to insure a proper guided movement of the stop holder and stop plate. The guide wheels 30 are each rotatably mounted on an axle 31 which extends through a bifurcated bearing 32, the bearings 32 at opposite sides of the stop holder are secured to the upper and lower ends of a leaf spring 33 which is anchored at its medial portion by rivets 34 to the cross pieces 35 of the housing, the tension of the leaf spring 33 functioning to normally move the wheel peripheries out of contact with the grooves 29 of the stiles 22. Set screws 36 are threaded through the side wall 37 of the medial portion of the housing and engaged with the bearings 32 in order to regulate the frictional engagement of the wheels with the stop holder.

The stop holder 21 is provided in its opposite longitudinal edges with longitudinally spaced staggered keeper notches 38 adapted to be alternately engaged by oppositely arranged latch bars 39 and 40 which are normally projected into engagement with the opposite side stiles 22 of the stop holder 21 by coiled expansion springs 41.

The latch bars may be retracted in any desired manner, either manually or electrically, but as shown in the present disclosure the latches 39 and 40 are each carried by the core 42 of a solenoid 43 so as to be retracted when the same is energized. As shown, the enlarged medial portion 17 of the housing encloses the guide wheels and their mounting and the solenoids 43 are secured to the side walls 37 of the medial portion with the cores 42 extending inwardly through apertures therein, while the latches 39 and 40 protrude through apertures in the leaf springs 33, the cross pieces 35 and the bridge pieces 19.

The keeper notches 38 are so arranged with reference to the latch bars and the stop openings 28 as to automatically catch and retain the successive stop openings in registration with the focal axes of the lens elements, it being understood that when the latch bar engaging with one of the keeper notches is retracted and released therefrom, the stop holder will drop by gravity until the opposite latch bar engages the next succeeding keeper notch to again maintain the next succeeding stop opening in registration with the focal axes of the lens elements. Initially the stop holder with the stop plate arranged therein is moved to a position with the lowermost stop opening in registration with the lens elements and it will be obvious that by successively retracting the latch bars, the stop openings will be successively brought into registration with the lens elements, after which the stop holder is elevated for another exposure. The lower portion of the housing 10 is closed and the upper portion thereof is provided with hinged mating sections 44 which are normally closed and adapted to be manually swung to an open position for raising the stop holder and for inserting and removing the interchangeable stop plates and filters. In order to prevent the entrance of light through the apertured front wall of the enlarged medial portion 17 of the housing 10, a yieldable elastic ring 45 is snugly fitted over the forward section of the lens barrel C with its outer periphery snugly engaging the wall of the aperture 18. This effectually excludes the light without transmitting shocks to the lens barrel.

In order to provide means for automatically actuating the latch bars 39 and 40, use is made of a timing device which is illustrated in Figs. 8, 9 and 10 of the drawings. The timing device includes a base 50 having a pair of spaced standards 51 in which is journaled for rotation, a shaft 52 which is driven by a suitable motor 53 through the medium of a worm 54 and worm wheel 55 connected by a ratchet and pawl to the shaft 52.

A plurality of independent timing units are mounted in longitudinally spaced relation on the shaft 52, three being shown in the present instance and designated generally by the reference characters 56, 57 and 58, although it is to be understood that any number of said units may be employed within the scope of the invention. Each timing unit is composed of a plurality of cam disks corresponding in number to the number of stop openings and designated by the reference characters 61, 62, 63, 64 and 65. The cam disks are provided with concentric aligned openings fitted over the shaft 52 to freely rotate with reference thereto and spacers 66 are interposed between adjacent cam disks and are splined to the shaft 52 for turning movement therewith by means of keys 67 which extend into the spline groove 68 formed in the shaft. The shaft is also threaded between its opposite ends which are journaled in the standards 51 and a thrust collar 69 is fixed to the shaft by a set screw 70 on one side of the unit, while an adjustable nut 71 threadedly engages the shaft on the opposite side of the unit and is adapted when tightened to clamp the cam disks and washers to lock the same in a predetermined set relation. The peripheral edges of the cam disks are formed with annular flanges 72 each of which has protruding radially therefrom cam fingers, which cam fingers are respectively designated by the reference characters 73, 74, 75, 76 and 77.

A switch supporting arm 78 is swingably and slidably mounted on a supporting rod 79 which traverses the timing units 56, 57 and 58 and which rod is supported by standards 80 carried by the rear of the base 50. A stop bar 81 extends between the standards and is adapted to be engaged by a stop lug 82 on the switch supporting arm for disposing and retaining said arm in forwardly projecting superposed relation with one of the timing units, it being understood that the supporting arm 78 may be selectively positioned relative to any one of the units. In order to retain the supporting arm in its proper relation to the selected timing unit and prevent lateral sliding movement with reference thereto, a pair of depending ears 83 are provided which straddle the selected unit. The supporting arm carries a plurality of sets of switches corresponding in number to the number of cam disks, the sets being spaced so as to be disposed in the path of movement of the cam fingers 73 to 77 respectively.

The left hand switch set includes three spring contact arms 84, 85 and 86 normally separated and out of engagement, the lowermost contact being provided with a cam lug 87 which is adapted to be engaged by the contact finger 73 of the left hand cam disk 61. The next switch set includes two spring contact arms 88 and 89 which are normally separated and disposed out of engagement and the lower arm 89 of which is provided with a cam lug 90 adapted to be engaged by the cam fingers 74 of the cam disk 62. The next adjacent switch set includes spring contact arms 91 and 92 with a cam lug 93 adapted to be engaged by the cam finger 75 of the cam disk 63. The next switch set includes a pair of spring contact fingers 94 and 95, the latter having a cam lug 96 adapted to be engaged by the cam finger 76 of the cam disk 64. The remaining switch set includes three spring switch arms 97, 98 and 99, the latter having a cam lug 100 adapted to be engaged by the cam finger 77 of the disk 65.

An electric circuit having a source of current supply 101 includes conductors 102 and 103 leading therefrom. The conductor 102 is connected in parallel with the switch arms 86, 89, 92, 95 and 99, and with one side of the operating motor 53 while the conductor wire 103 is connected through a starting switch 104 to the other side of the motor. The solenoid 43 for the latch bar 39 is connected by a conductor 105 respectively to the contact arms 84 and 91, while the solenoid 43 for the latch bar 40 is connected by circuit wire 106 to the switch arms 88, 94 and 97 respectively. The solenoids are connected in parallel by a conductor 107 to the electromagnet 108 of a shutter operating device 109 and from the solenoid to the conductor 103. The contact arm 85 is connected by a conductor 110 to the winding of an electromagnet 111 from which a conductor 112 leads to the conductor 103. The armature 113 of the electromagnet 111 is adapted when the magnet 111 is energized to release a flash curtain or vehicle, not shown, but which is commonly used when making the flash exposure of the light sensitive film or coating in producing screen negatives. The spring contact arm 98 is connected by a conductor 116 to an electromagnet 117 which is adapted when energized to open the starting switch 104 and render the motor 53 inactive.

In order to provide means for gaging the setting of the cam fingers 73 to 77, the outer surfaces of the flanges 72 of the cam disks are provided with graduations and indicia 120 and in setting the fingers and disks the adjustable nut 71 is loosened, the disks turned to dispose the fingers at the desired predetermined relative positions and distances from the contact lugs 87, 90, 93, 96 and 100 respectively, so as to effect the desired period of time exposure of the various stop openings 28. After the cam fingers and disks of each unit have been set, the adjustable nuts 71 are tightened to lock the disks in relatively set positions.

The stop holder 21 with the stop plate 27 therein is elevated with the lowermost stop opening disposed in registration with the focal axes of the lens elements D. This disposes the latch bar 39 in the lowermost keeper notch 38. The flash curtain or vehicle is disposed in operation with reference to the camera and engaged by the armature 113 of the electromagnet 111.

In operation the camera shutter is opened simultaneously with the manual closing of the operating switch 104 with the conductor wire 103 thereby starting the motor 53. This turns the shaft 52 together with the cam disks and fingers so that said fingers successively actuate the sets of switches as the fingers engage the cam lugs.

When the first cam finger 73 engages the cam lug 87, it simultaneously engages the contacts 84, 85, and 86 which closes the circuit through the electromagnet 111 and releases the flash curtain or vehicle while closing the circuit to the solenoid 43 that controls the latch bar 39 thereby retracting the same from the lowermost keeper notch 38. This permits the stop holder 21 to gravitationally descend until the latch bar 40 engages within the next succeeding keeper notch 38 to dispose and retain the next succeeding stop opening 28 in registration with the camera lens. Simultaneously with the closing of the circuit to the solenoid 43 of the latch 39, the electromagnet 108 which is in series therewith will be energized to close the shutter until the next succeeding stop opening is in registration with the camera lens, after which the shutter is automatically opened to thereby expose the light sensitive film or coating through said stop opening until the cam finger 74 is moved into engagement with the cam lug 90 of the second switch set. This operation engages the spring contacts 88 and 89 and closes the circuit to the solenoid 43 of the latch bar 40, retracting the same from the keeper opening 38 and causing the stop holder 21 to descend by gravity until the latch bar 39 engages the next succeeding keeper opening which disposes and retains the next succeeding stop opening 28 in registration with the camera lenses. The shutter operating means is again actuated by the electromagnet 108 whereby the film is then exposed through said stop opening until the next succeeding cam finger 75 engages the cam lug 93 of the next adjacent switch set. This engages the spring contacts 91 and 92 to close the circuit to the solenoid 43 controlling the latch bar 39 whereby the same is retracted to again permit the gravitational descent of the stop holder and the registration and retention of the next succeeding stop opening with the camera lens simultaneously with the opening and closing of the camera shutter. Obviously, the film is then exposed through said stop opening until the next cam finger 76 engages the cam lug 96 to effect engagement of the spring contacts 94 and 95 to close the circuit to the solenoid 43 for retracting the latch bar 40. This causes the descent of the stop holder 21 until the uppermost stop opening is disposed in registration with the camera lens and retained in place by the latch bar 39 engaging in the uppermost keeper notch 38, the camera shutter being again closed and opened so as to expose the film through said uppermost stop opening until the last cam finger 77 has moved into contact with the cam lug 100. This effects the simultaneous engagement of the contact arms 97, 98 and 99 and again closes the circuit to the electromagnet 108 which closes the shutter while at the same time energizing the electromagnet 117 to open the operating switch 104 and stop the motor thereby completing the exposure of the light sensitive film or coating through the various stop openings for the predetermined set periods of time. Obviously, by repeating the operation with the same stop plate and the same setting of the same timing unit or other negatives, the negatives or positives will possess identically the same characteristics as the possibility of error due to manual gaging of the periods of exposure is eliminated. Furthermore, the employment of a stop plate having fixed stop openings insures uniformity of performance on each negative or positive.

Figure 12:
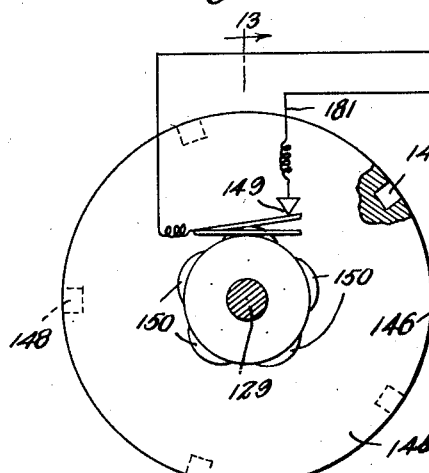
Fig. 12 is an enlarged side view of the stop device actuating mechanism illustrated in Fig. 11.
Figure 13:
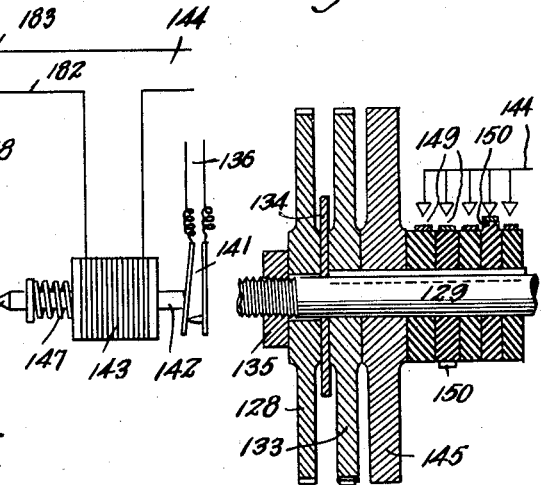
Fig. 13 is a sectional view taken on the line 13—13 of Fig. 12.
Figure 14:
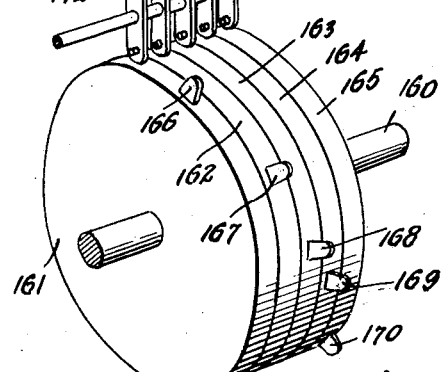
Fig. 14 is a diagrammatic perspective view of an alternate form of switch means for the timing device.

In the form of the invention disclosed in Figs. 11, 12 and 13 inclusive, the stop frame or holder 125 for the stop plate 27 is substantially identical with that shown in the previously described form and is similarly housed and guidedly mounted. In this instance, however, it is shifted in successive stages so as to dispose the stop plate openings 28 in registration with the focal axis of the camera lens in the lens barrel C by an equivalent but alternate type of mechanism which may be controlled manually or by a timing device such as shown in Figure 14.

This mechanism includes a thrust member 126 which is secured to a suitably guided rack bar 127 meshing with a pinion 128 on a rotary shaft 129 which shaft is journaled in fixed bearings not shown. The shaft is driven by any type of electric motor 130 through a speed reduction gearing in a gear box 131 having an exposed gear 132 meshing with a gear 133 keyed to the shaft 129. The pinion is driven with the shaft 129 by a friction washer 134 interposed between the same and the gear 133, the pinion being impinged against the friction washer and said friction washer being forced into engagement with the gear 133 by means of a thrust nut 135. This permits a slippage of the pinion 128 when resetting the stop plate and its holder or frame 125 after the same has been operated by the mechanism.

The motor 130 is arranged in an electric circuit 136 having a source 137 and including in series with the motor an electromagnet 138, the armature 139 of which closes the camera shutter 140 when the electromagnet is energized. The circuit 136 also has interposed therein a switch 141 which is so located as to be engaged and closed by the outer end of the core 142 of a solenoid 143, the winding of which is arranged in a circuit 144 which is either manually opened or closed, or controlled by a timing device such as those shown or an equivalent thereof.

The solenoid 143 is supported with its axis disposed radially to a control disk 145 keyed to and rotatable with the shaft 129. The inner end of the solenoid core 142 carries a pointed terminal 146 and when the solenoid is deenergized, a spring 147 urges said core terminal radially inward into engagement with the periphery of said control disk which is provided with a series of circumferentially spaced depressions 148.

Assuming the terminal 146 to be engaged within one of the depressions 148, the arrangement is such that when the solenoid is energized and shifts the core 142 radially outward against the tension of the spring 147, the switch 141 is closed to render the motor active. This, through the turning of the shaft 129 and the control disk 145 maintains the switch 141 in circuit closing position by virtue of the engagement of the terminal 146 with the periphery of the disk even though the solenoid 143 is only momentarily energized. The turning of the shaft 129 also turns the pinion 128 which effects movement of the rack bar 127 thereby shifting the stop plate and its frame or holder 125. Obviously, when the control disk 145 has turned a distance to bring the next succeeding depression 148 into registry with the solenoid core terminal 146, the spring will effect inward radial movement of the core, thereby opening the switch 141 to break the circuit to the motor 130, thus discontinuing the movement of the stop plate 27 and its frame or holder 125. The extent of movement imparted to the stop plate holder 125 is regulated by the distance between the depressions 148 in the control disk 145 and this distance coincides with the spacing between the centers of the stop plate openings 28 so that each movement successively disposes one of the stop openings in registration with the focal axis of the camera lens in the lens barrel C.

In order to preclude any possibility of failure of the breaking of the motor circuit 136 as each depression 148 of the control disk 145 is brought into registry with the terminal 146 of the solenoid core 142, means is provided for insuring the positive deenergizing of the solenoid 143 before the next succeeding depression 148 arrives in registry with the solenoid core terminal 146. As illustrated, said means consists of a plurality of switches 149 arranged in series in the solenoid circuit 144 which switches correspond in number to the number of depressions 148 in the control disk. The switches 149 are of the type which are normally open to break the circuit but which are arranged in juxtaposition to a corresponding number of cams 150 circumferentially arranged about and secured to the shaft 129 to rotate therewith. The circumferential arrangement or distribution of the cams 150 around the shaft is such that they successively close the circuit through their corresponding switches 149 prior to the time the corresponding depression 148 of the control disk arrives in registry with the solenoid core terminal 146. It thus follows that in event the solenoid 142 should be energized up to this time by manual retention or retention by the timing device, the solenoid circuit will be automatically broken by the proper cam 150 moving out of engagement with its respective switch 149. This will prevent the movement of the succeeding stop plate opening 28 beyond the point of proper registration with the camera lens and thereby insure that the extent of movement of the stop plate is properly controlled by the control disk 145.

An equivalent but alternate type of timing device is illustrated in Fig. 14 which includes a motor driven shaft 160 upon which a plurality of cam disks are mounted corresponding to the number of stop openings, five being shown in the present disclosure and being respectively designated by the reference characters 161, 162, 163, 164 and 165. Each cam disk has a cam finger which fingers are respectively designated 166, 167, 168, 169 and 170. The construction, mounting and setting of the cam disks are identical with that of the timing units 56, 57 and 58 but in this form of the timing device, the switch means for opening and closing the control circuits consists of a plurality of pivoted arms 171, 172, 173, 174, and 175 which have their lower ends respectively disposed in the path of movement of the cam fingers. The upper ends of the arms have respectively mounted thereon mercury switches 176, 177, 178, 179 and 180 which, when the arms are in normal position, open or break the control circuits and which, when engaged by the cam fingers, tilt said mercury switches to close said circuits. Each mercury switch has a conductor 181 leading from one contact to the conductor 182 of the circuit 144. The remaining contacts of the mercury switches are respectively connected by circuit wires 183, 184, 185, 186 and 187 to the respective contact fingers of the switches 149.

What is claimed is:

1. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism comprising a rack bar operatively associated with the stop plate, a pinion engaging the rack bar, a rotary shaft for turning the pinion, an electric motor for turning said shaft, a motor circuit including a switch, means for actuating said switch to close the motor circuit, and means rotatable with the shaft for controlling the opening of said switch when the stop plate openings register with the camera lens.

2. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, an electric motor for turning said shaft, a motor circuit having a switch, means for actuating said switch to close the motor circuit, and means rotatable with the shaft for controlling said switch to break the motor circuit when the stop plate openings register with the camera lens.

3. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, an electric motor for turning said shaft, a motor circuit having a switch, means for actuating said switch to close the motor circuit, a shutter for said camera having means arranged in series in the motor circuit for closing the shutter when the motor circuit is completed and for opening the shutter when the motor circuit is broken, and means rotatable with the shaft for controlling said switch to break the motor circuit when the stop plate openings register with the camera lens.

4. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, an electric motor for turning said shaft, a motor circuit having a switch, electrically operated time controlled means for actuating said switch to close the motor circuit, and means rotatable with the shaft for controlling said switch to break the motor circuit when the stop plate openings register with the camera lens.

5. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, an electric motor for turning said shaft, a motor circuit having a switch, time controlled means for actuating said switch to close the motor circuit, and means rotatable with the shaft for controlling said switch to break the motor circuit when the stop plate openings register with the camera lens.

6. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, an electric motor for turning said shaft, a motor circuit having a switch, electrically operated time controlled means for actuating said switch to close the motor circuit, and means rotatable with the shaft for controlling said switch to break the motor circuit when the stop plate openings register with the camera lens, and means rotatable with said shaft for controlling the circuit of the time control means.

7. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, a motor for turning said shaft, means for rendering said motor active, and means rotatable with the shaft for rendering the motor inactive when the stop plate openings register with the camera lens.

8. A stop device for use with cameras employed in the production of screen negatives or positives, including a stop plate having a plurality of stop openings of different sizes, means for housing and guidedly mounting the stop plate for movement in a plane intersecting the focal axis of the camera lens and mechanism for effecting movement of the stop plate to successively dispose the stop openings in registration with the camera lens to successively expose through the several stop openings each light sensitive film to complete the exposure of each negative or positive, said mechanism including a rotary shaft having operative connection with the stop plate for successively moving the same to dispose the stop openings in registration with the camera lens, a motor for turning said shaft, a shutter for said camera and means operable when the motor is active for closing the shutter and when the motor is inactive for opening the shutter, and means rotatable with the shaft for rendering the motor inactive when the stop plate openings register with the camera lens.

9. In a camera for the photographic production of screen negatives or positives, a stop device supported in juxtaposition to the front board of the camera and including a stop holder, a stop plate provided with a plurality of fixed stop openings of various sizes removably associated with said stop holder, guide means resiliently engaging said holder at the opposite longitudinal side edges thereof and between which guide means the said holder is mounted for tensioned guided movement to successively expose each film through the several stop openings to complete the exposure thereof, and detent means engageable with the stop holder for positioning and releasably retaining the stop plate in positions with the several stop openings thereof successively in registration with the camera lens.

10. In a camera for the photographic production of screen negatives or positives, a stop device supported in juxtaposition to the front board of the camera and including a stop holder, a stop plate provided with a plurality of fixed stop openings of various sizes removably associated with said stop holder, guide means resiliently engaging said holder at the opposite longitudinal side edges thereof and between which guide means the said holder is mounted for tensioned guided movement to successively expose each film through the several stop openings to complete the exposure thereof, means engageable with said guide means for varying the tension of the said guide means on the holder, and detent means engageable with the stop holder for positioning and releasably retaining the stop plate in positions with the several stop openings thereof successively in registration with the camera lens.

11. In a camera having a lens barrel provided with a passageway therethrough in a plane perpendicular to the axis thereof for the photographic production of screen negatives or positives, a housing, said housing having aligned openings in the front and rear walls thereof through which openings the lens barrel protrudes in spaced relation with the edge of the openings, a stop device having a plurality of fixed stop openings of different sizes, means carried by and within said housing mounting the said stop device for guided movement through said passageway to successively dispose the stop openings in registration with the camera lens, and cooperating cushioned means carried by the front board of the camera and said housing for resiliently supporting said housing and preventing the transmission to the camera lens of shocks resulting from the movement of said stop device within the housing.

12. In a camera for the photographic production of screen negatives or positives, a stop device supported in juxtaposition to the front board of the camera and including a stop holder adapted to selectively receive and support one of a plurality of stop plates, each of which is provided with a plurality of fixed stop openings of various sizes, a plurality of spaced pairs of guide wheels resiliently mounted for turning movement in a common plane and between which the stop holder is arranged for tensioned guided movement to successively dispose the stop openings in registration with the camera lens to successively expose through the several stop openings each negative or positive to complete the exposure thereof, and detent means engageable with the stop holder for positioning and releasably retaining the said stop plate in positions with the several stop openings thereof successively in registration with each negative or positive.

13. In a camera for the photographic production of screen negatives or positives, a stop device supported in juxtaposition to the front board of the camera and including a stop holder adapted to selectively receive and support one of a plurality of stop plates, each of which is provided with a plurality of fixed stop openings of various sizes, a plurality of spaced pairs of guide wheels resiliently mounted for turning movement in a common plane and between which the stop holder is arranged for tensioned guided gravitational movement to successively dispose the stop openings in registration with the camera lens to successively expose through the several stop openings each negative or positive to complete the exposure thereof, means for regulating the tension of the guide wheels on the stop holder to vary the speed of descent thereof, and detent means engageable with the stop holder for positioning and releasably retaining the said stop plate in positions with the several stop openings thereof successively in registration with each negative or positive.

AUGUST C. HANSCH.
HENRY E. HANSCH.